United States Patent
Sharma et al.

(10) Patent No.: US 10,578,886 B1
(45) Date of Patent: Mar. 3, 2020

(54) LENS POSITION ADJUSTMENT USING COMPRESSED OPTICAL IMAGE STABILIZATION COILS HAVING BI-CONCAVE SHAPE

(71) Applicant: Apple Inc., Cupertino, CA (US)

(72) Inventors: Shashank Sharma, San Francisco, CA (US); Scott W. Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 465 days.

(21) Appl. No.: 15/169,636

(22) Filed: May 31, 2016

(51) Int. Cl.
*G02B 27/64* (2006.01)
*G03B 5/00* (2006.01)
*H04N 5/225* (2006.01)
*G02B 7/08* (2006.01)
*H04N 5/232* (2006.01)

(52) U.S. Cl.
CPC ............ *G02B 27/646* (2013.01); *G02B 7/08* (2013.01); *G03B 2205/0007* (2013.01); *G03B 2205/0069* (2013.01); *H04N 5/2253* (2013.01); *H04N 5/23287* (2013.01)

(58) Field of Classification Search
CPC . G02B 7/023; G02B 7/09; G02B 7/10; G02B 7/102; G02B 23/16; G02B 27/64; G02B 27/646; G03B 2205/0007; G03B 2205/0015; G03B 2205/0023; G03B 2205/0038; G03B 2205/0069; G03B 2205/0084; H04N 5/2253; H04N 5/23264; H04N 5/2328; H04N 5/23287
USPC ............... 348/208.99, 208.4, 208.7, 208.11; 359/554, 557, 819, 822, 823, 824; 396/52, 55
See application file for complete search history.

(56) References Cited

U.S. PATENT DOCUMENTS

| | | | | |
|---|---|---|---|---|
| 5,513,047 A | * | 4/1996 | Matsui .................. | G11B 7/0932 359/814 |
| 2011/0039599 A1 | * | 2/2011 | Shiraki .................... | G02B 7/08 455/556.1 |
| 2012/0154614 A1 | | 6/2012 | Moriya et al. | |
| 2013/0050828 A1 | * | 2/2013 | Sato ........................ | G02B 27/64 359/557 |
| 2015/0153539 A1 | * | 6/2015 | Yoo .......................... | G02B 7/04 348/373 |
| 2016/0154249 A1 | * | 6/2016 | Yeo .......................... | G03B 5/00 359/557 |
| 2018/0157004 A1 | * | 6/2018 | Huang .................... | G02B 7/08 |

* cited by examiner

*Primary Examiner* — Ryan S Dunning
(74) *Attorney, Agent, or Firm* — Robert C. Kowert; Kowert, Hood, Munyon, Rankin & Goetzel, P.C.

(57) ABSTRACT

Some embodiments of a camera unit of a multifunction device include an actuator for moving the optical package relative to the image sensor. In some embodiments, the actuator includes one or more lateral magnets situated at one or more sides of the optical package. In some embodiments, the actuator includes one or more optical image stabilization coils for circulating electric current in a plane perpendicular to the an optical axis of the optical package to generate magnetic interactions with a respective one of the one or more lateral magnets. In some embodiments, each of the optical image stabilization coils has an interior surface boundary, and a space enclosed by the interior surface boundary has a width smaller at a center of a length of the optical image stabilization coil than at the ends of the optical image stabilization coil.

11 Claims, 6 Drawing Sheets

LENS POSITION ADJUSTMENT USING COMPRESSED OPTICAL IMAGE STABILIZATION COILS HAVING BI-CONCAVE SHAPE

BACKGROUND

Technical Field

This disclosure relates generally to position measurement and more specifically to position measurement for managing the motion of camera components.

Background

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis (referred to as the Z axis) of the camera to refocus the camera.

In addition, high image quality is easier to achieve in small form factor cameras if lens motion along the optical axis is accompanied by minimal parasitic motion in the other degrees of freedom, for example on the X and Y axes perpendicular to the optical (Z) axis of the camera. Thus, some small form factor cameras that include autofocus mechanisms may also incorporate optical image stabilization (OIS) mechanisms that may sense and react to external excitation/disturbance by adjusting location of the optical lens on the X and/or Y axis in an attempt to compensate for unwanted motion of the lens. In such systems, the size of components for moving camera optics or image sensors is an obstacle to the implementation of designs.

SUMMARY OF EMBODIMENTS

Some embodiments of a camera unit of a multifunction device include an image sensor, an optical package for directing light to the image sensor along an optical axis of the optical package, and an actuator for moving the optical package relative to the image sensor in one or more degrees of freedom. In some embodiments, the actuator includes one or more lateral magnets situated at one or more sides of the optical package. In some embodiments, each of the one or more magnets has a respective magnetic field aligned in a direction perpendicular to a direction of the optical axis of the optical package. In some embodiments, the actuator includes one or more optical image stabilization coils for circulating electric current in a plane perpendicular to the an optical axis of the optical package to generate magnetic interactions with a respective one of the one or more lateral magnets. In some embodiments, each of the optical image stabilization coils has an interior surface boundary, and a space enclosed by the interior surface boundary has a width smaller at a center of a length of the optical image stabilization coil than at the ends of the optical image stabilization coil.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction to Autofocus Camera Embodiments

Some embodiments include camera equipment outfitted with controls, coils, and magnets to improve the position accuracy of a miniature actuation mechanism for a compact camera module. More specifically, in some embodiments, compact camera modules include actuators to deliver functions such as autofocus (AF) and optical image stabilization (OIS). One approach to delivering a very compact actuator for OIS is to use a Voice Coil Motor (VCM) arrangement, though, as one of skill in the art will readily understand in light of having read the present disclosure, other arrangements such as MEMS actuators may also be included in some embodiments without departing from the scope and intent of the present disclosure. In some embodiments, plural magnets interact with an autofocus coil and/or optical image stabilization coils bonded to the moving body of the OIS actuator.

For OIS and autofocus cameras, embodiments are frequently implemented in systems with magnet and coil actuators moving a lens body relative to an image sensor.

Some embodiments of a camera unit of a multifunction device include an image sensor, an optical package for directing light to the image sensor along an optical axis of the optical package, and an actuator for moving the optical package relative to the image sensor in one or more degrees of freedom. In some embodiments, the actuator includes one or more lateral magnets situated at one or more sides of the optical package. In some embodiments, each of the one or more magnets has a respective magnetic field aligned in a direction perpendicular to a direction of the optical axis of the optical package. In some embodiments, the actuator includes one or more optical image stabilization coils for circulating electric current in a plane perpendicular to the an optical axis of the optical package to generate magnetic interactions with a respective one of the one or more lateral magnets. In some embodiments, each of the optical image stabilization coils has an interior surface boundary, and a space enclosed by the interior surface boundary has a width smaller at a center of a length of the optical image stabilization coil than at the ends of the optical image stabilization coil.

In some embodiments, the one or more optical image stabilization coils include an exterior surface boundary having first side and a second side relative to the length. In some embodiments, the first side is of a concave shape relative to a center of the coil. In some embodiments, the second side is of a concave shape relative to the center of the coil.

In some embodiments, the one or more optical image stabilization coils include an exterior surface boundary having first side and a second side relative to the length. In some embodiments, the first side is of a concave shape, and the second side is of a convex shape.

In some embodiments, a convex shape includes an arrangement such that a coil side having an interior length centered on a center has a width at the center that is constant across the length, and a concave shape comprises an arrangement such that a coil side having an interior length and a center has an interior to exterior width at the center less than an interior to exterior width at an end of the interior length.

In some embodiments, each of the one or more optical image stabilization coils is arranged in a compressed oval ring cylinder shape having a first axis of bilateral symmetry and no second axis of bilateral symmetry.

In some embodiments, each of the one or more optical image stabilization coils is arranged in a compressed oval ring cylinder shape having a first axis of bilateral symmetry and a second axis of bilateral symmetry.

In some embodiments, each of the one or more optical image stabilization coils is arranged in a compressed oval ring cylinder shape, wherein an interior length of an interior space enclosed by the oval ring cylinder shape is greater than an interior width of the interior space enclosed by the oval ring cylinder shape.

In some embodiments, the one or more optical image stabilization coils include a pair of optical image stabilization coils situated opposite one another with respect to the optical package and circulating current in opposite directions of rotation.

Some embodiments of an electromagnetic actuator include one or more lateral magnets situated at one or more sides of a member movable by the actuator, and one or more coils for generating magnetic interactions with a respective one of the one or more lateral magnets to move the member, wherein each of the one or more coils has an interior surface boundary, and a space enclosed by the interior surface boundary has a width greater at ends of a length of the space than at a center of a length of the space.

In some embodiments, each of the one or more magnets has a respective magnetic field aligned in a direction perpendicular to a direction of motion of the member.

In some embodiments, the one or more coils include an exterior surface boundary having first side and a second side relative to the length, the first side is of a concave shape relative to a center of the coil, and the second side is of a concave shape relative to the center of the coil.

In some embodiments, the one or more coils include an exterior surface boundary having first side and a second side relative to the length, the first side is of a concave shape, and the second side is of a convex shape. In some embodiments, the concave shape includes a first bend and a second outward from a length centerline and a third bend and a fourth bend inward toward the length centerline. In some embodiments, the convex shape includes a first convex bend and a second convex outward from a length centerline without any third bend any the fourth bend inward toward the length centerline.

In some embodiments, the electric current coil is arranged in a compressed oval ring cylinder shape having a first axis of bilateral symmetry and no second axis of bilateral symmetry.

In some embodiments, the electric current coil is arranged in a compressed oval ring cylinder shape having a first axis of bilateral symmetry and a second axis of bilateral symmetry.

In some embodiments, the electric current coil is arranged in a compressed oval ring cylinder shape. In some embodiments, an interior length of an interior space enclosed by the oval ring cylinder shape is greater than an interior width of the interior space enclosed by the oval ring cylinder shape.

In some embodiments, the one or more coils include a pair of optical image stabilization coils situated opposite one another with respect to the optical package and circulating in opposite directions if rotation.

In some embodiments, a camera unit of a multifunction device includes an image sensor and an actuator for adjusting the light captured by the image sensor through movement of the actuator in one or more degrees of freedom. In some embodiments, the actuator includes one or more lateral magnets situated at one or more sides of the actuator. In some embodiments, each of the one or more magnets has a respective magnetic field aligned in a direction perpendicular to a direction perpendicular to a light-receiving surface of the image sensor. In some embodiments, the camera unit further includes one or more optical image stabilization coils for circulating electric current in a plane perpendicular to the an optical axis of the direction perpendicular to a light-receiving surface of the image sensor to generate magnetic interactions with a respective one of the one or more lateral magnets. In some embodiments, each of the optical image stabilization coils has an interior surface boundary. In some embodiments, a space enclosed by the interior surface boundary has a width smaller at a center of a length of the optical image stabilization coil than at the ends of the optical image stabilization coil.

In some embodiments, the one or more optical image stabilization coils include an exterior surface boundary having first side and a second side relative to the length, the first side is of a concave shape relative to a center of the coil, and the second side is of a concave shape relative to the center of the coil.

In some embodiments, the one or more optical image stabilization coils include an exterior surface boundary having first side and a second side relative to the length. In some embodiments, the first side is of a concave shape, and the second side is of a convex shape.

In some embodiments, each of the one or more optical image stabilization coils is arranged in a compressed oval ring cylinder shape having a first axis of bilateral symmetry and no second axis of bilateral symmetry.

In some embodiments, each of the one or more optical image stabilization coils is arranged in a compressed oval ring cylinder shape having a first axis of bilateral symmetry and a second axis of bilateral symmetry.

In some embodiments, each of the one or more optical image stabilization coils is arranged in a compressed oval ring cylinder shape, wherein an interior length of an interior space enclosed by the oval ring cylinder shape is greater than an interior width of the interior space enclosed by the oval ring cylinder shape.

In some embodiments, the one or more optical image stabilization coils include a pair of optical image stabilization coils situated opposite one another with respect to the optical package and circulating current in opposite directions of rotation.

Multifunction Device Examples

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1:
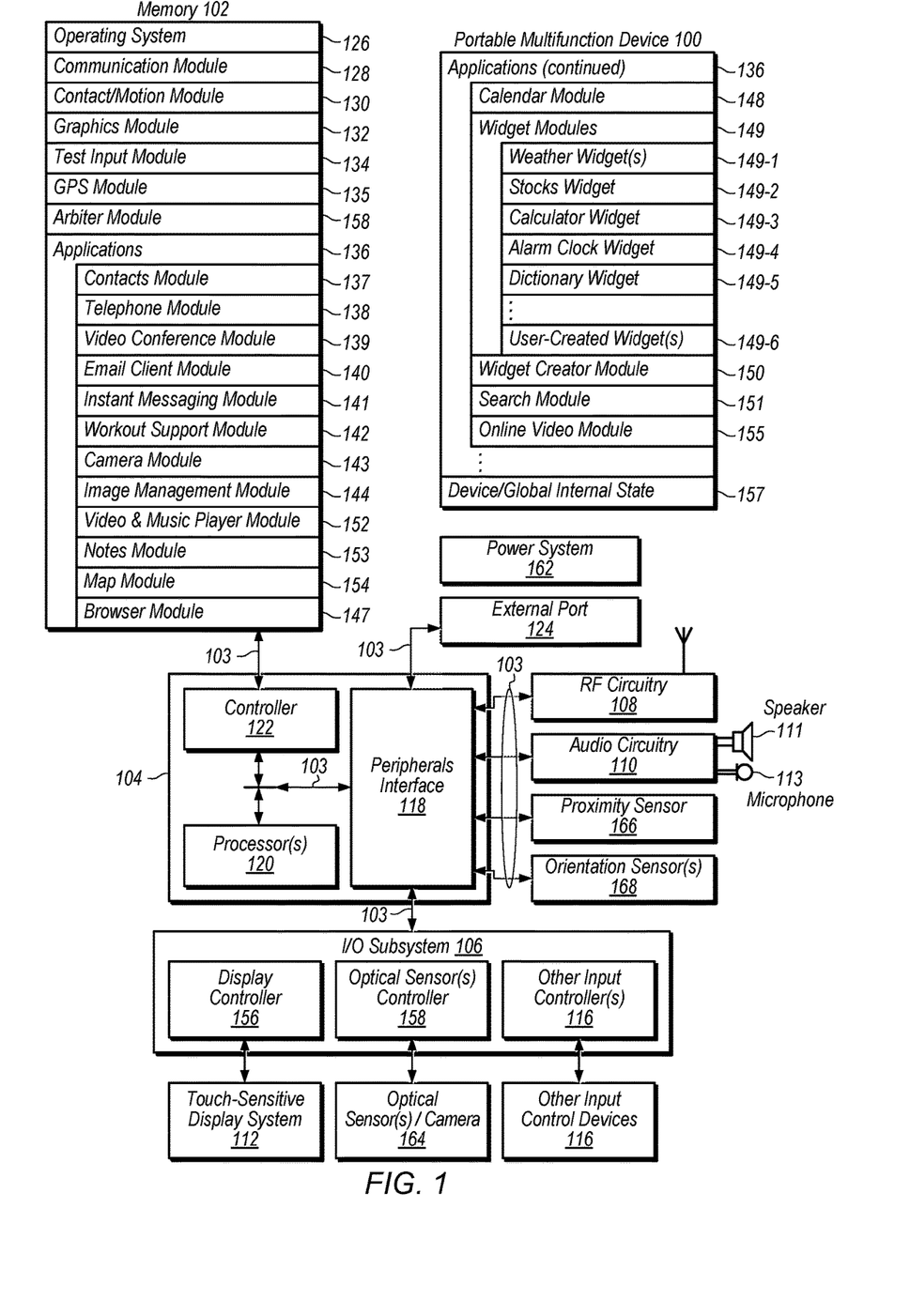
FIG. 1 illustrates a block diagram of a portable multi-function device with a camera in accordance with some embodiments.

Attention is now directed toward embodiments of portable devices with cameras. FIG. 1 is a block diagram illustrating portable multifunction device 100 with camera 164 in accordance with some embodiments. Camera 164 is sometimes called an "optical sensor" for convenience, and may also be known as or called an optical sensor system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 2 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an example embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to inductive, resistive, infrared, and surface acoustic wave technologies, as well as other proximity sensor arrays or other elements for determining one or more points of contact with touch screen 112. In an example embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 28 shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 28 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 28 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which may be made up of a video player
module and a music player module;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 2:
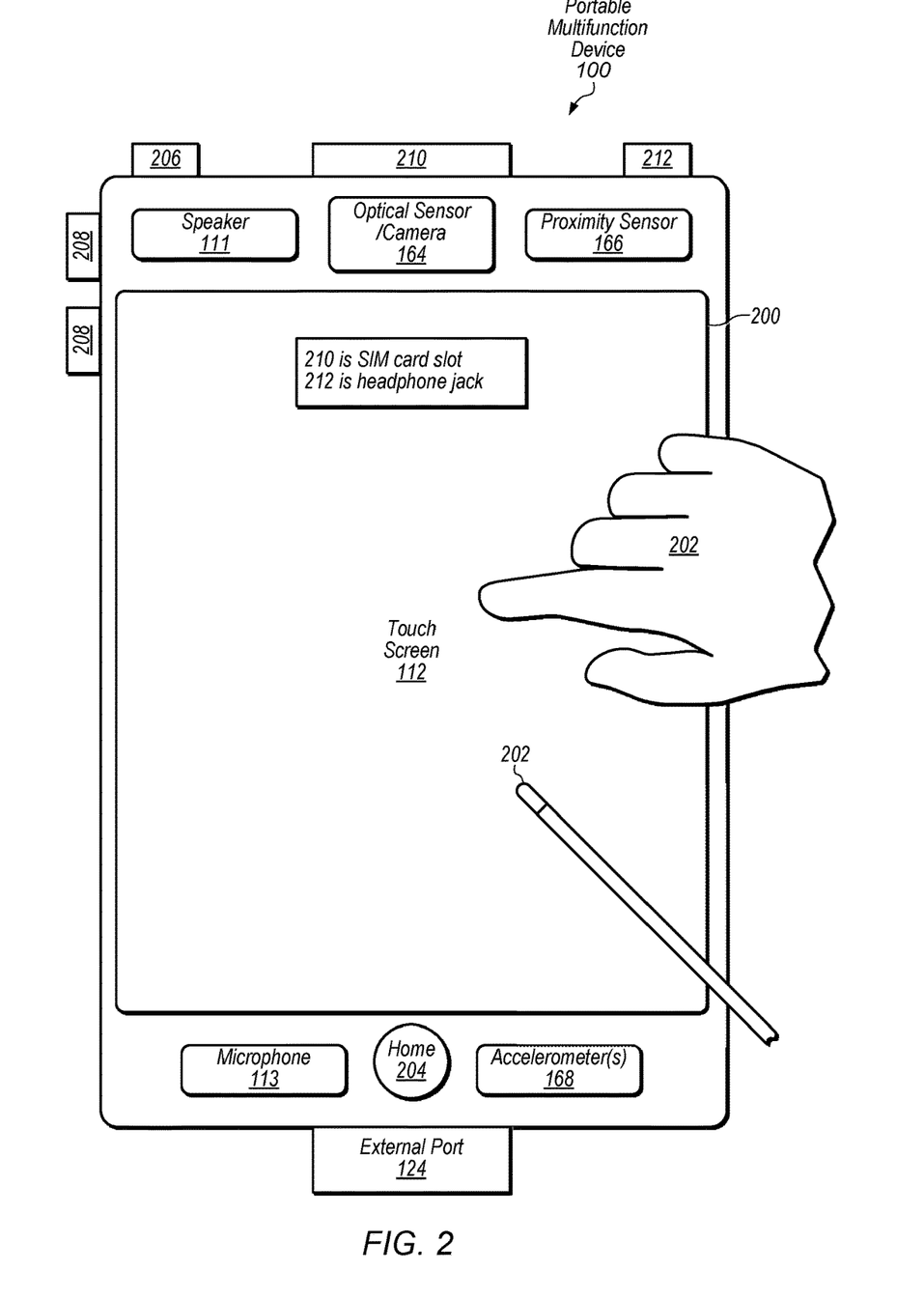
FIG. 2 depicts a portable multifunction device having a camera in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the examples herein are given with reference to optical sensor/camera 164 (on the front of a device), a rear-facing camera or optical sensor that is pointed opposite from the display may be used instead of or in addition to an optical sensor/camera 164 on the front of a device.

Figure 3:
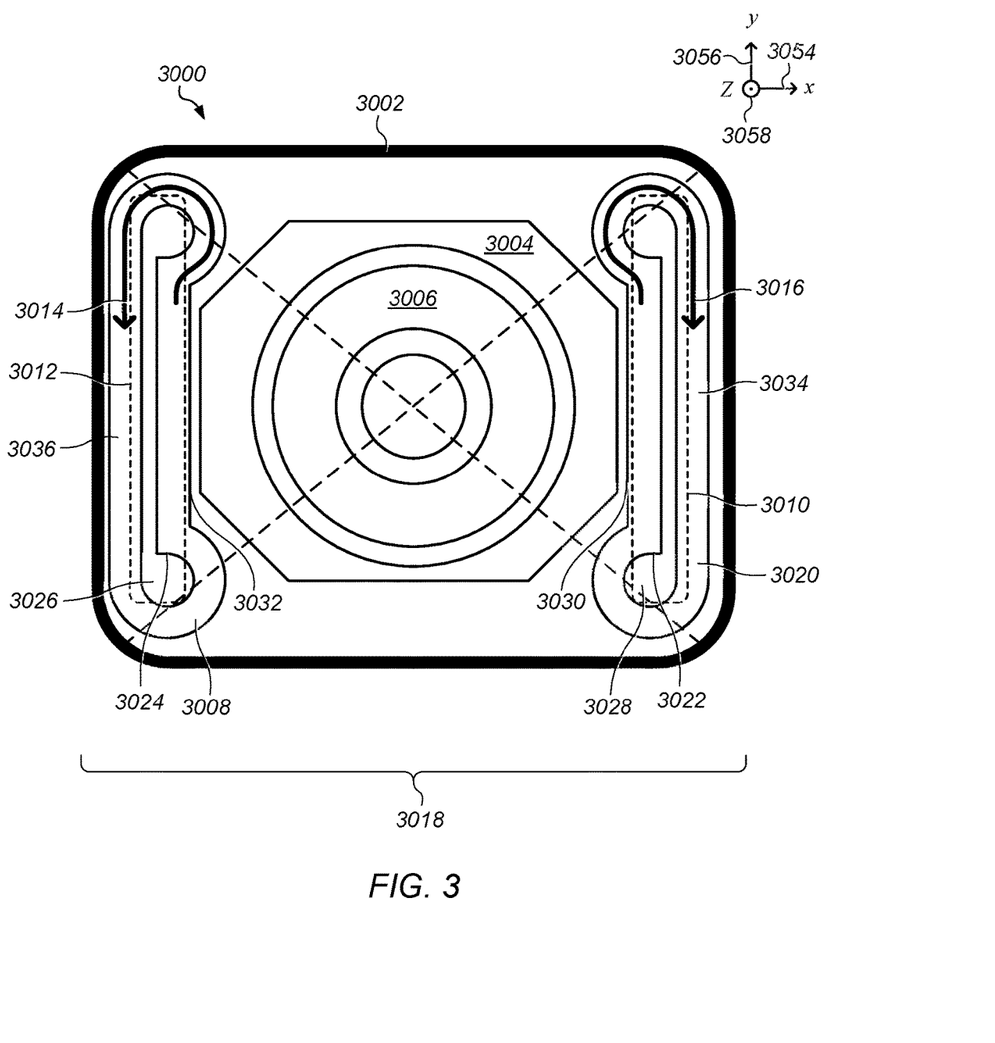
FIG. 3 illustrates a schematic of components of an example embodiment of an actuator module or assembly with coils designed according to at least some embodiments.

FIG. 3 illustrates a schematic of components of an example embodiment of an actuator module or assembly with coils designed according to at least some embodiments. Some embodiments of a camera unit 3000 of a multifunction device include an image sensor (not shown), an optical package 3006 in an optics holder 3004 for directing light to the image sensor along an optical axis of the optical package 3006, and an actuator 3018 for moving the optical package 3006 relative to the image sensor in one or more degrees of freedom (e.g. one or more of, x 3054, y 3056 and z 3058). In some embodiments, the actuator 3018 includes one or more lateral magnets 3010 and 3012 situated at one or more sides of the optical package 3006.

In the embodiment shown, two lateral magnets 3012 and 3010 are situated at two opposite sides of the optical package 3006, but one of ordinary skill in the art will realize in light of having read the present disclosure that configurations are possible in which other quantities of lateral magnets are situated on opposite sides of the optical package 3006, and such embodiments do not depart from the scope and intent of the present disclosure. Additionally, some embodiments will include "non-paired" magnets and coils with no corresponding magnet on an opposite side of optical package 3006, and such embodiments do not depart from the scope and intent of the present disclosure.

In some embodiments, each of the one or more magnets 3012 and 3010 has a respective magnetic field (not shown) aligned in a direction perpendicular to a direction of the z-axis 3058, (e.g., the direction of depth staring into the diagram) of the camera unit 3000. In some embodiments, the actuator 3018 includes one or more optical image stabilization coils 3008 and 3020 for circulating respective electric currents 3014 and 3016 in a plane perpendicular to the z-axis 3058 of the camera unit 3000 to generate magnetic interactions with a respective one of the one or more lateral magnets 3012 and 3010.

In the embodiment shown, two coils 3008 and 3020 are situated at two opposite sides of the optical package 3006, but one of ordinary skill in the art will realize in light of having read the present disclosure that configurations are possible in which other quantities of coils are situated on opposite sides of the optical package 3006, and such embodiments do not depart from the scope and intent of the present disclosure. Specifically, one of ordinary skill in the art will realize in light of having read the present disclosure that configurations are possible in which stacks of coils in the respective positions shown in FIG. 3 are used, layered in the z 3058 direction. Additionally, one of ordinary skill in the art will realize in light of having read the present disclosure that configurations are possible in which two sets of coils aligned perpendicular to each other (for example, one set running parallel on opposite sides along x, one set on opposite sides along y). One of ordinary skill in the art will realize in light of having read the present disclosure that configurations are possible in which combinations of the coil configurations discussed herein are deployed. Additionally, some embodiments will include "non-paired" magnets and coils with no corresponding magnet on an opposite side of optical package 3006, and such embodiments do not depart from the scope and intent of the present disclosure.

In some embodiments, each of the optical image stabilization coils 3008 and 3020 has an interior surface boundary (3024 and 3022 respectively), and a space (3026 and 3028 respectively) enclosed by the interior surface boundary and having a width (e.g., a dimension in x 3054) smaller at a center of a length (e.g., a dimension in y 3056) of the optical image stabilization coil 3008 and 3020 than at the ends of the length of the optical image stabilization coil 3008 and 3020. Additionally, one of ordinary skill in the art will realize in light of having read the present disclosure that, in some embodiments, space 3026 may be significantly reduced eliminated along some or all a length of optical image stabilization coil 3008 and 3020, such that the interior surface boundaries of optical image stabilization coil 3008 and 3020 will be in direct contact with other portions of respective ones of the interior surface boundaries of optical image stabilization coil 3008 and 3020.

In some embodiments, the one or more optical image stabilization coils 3008 and 3020 include an exterior surface boundary having first side 3030 and 3032 and a second side 3034 and 3036 relative to the length. In some embodiments, the first side 3030 and 3032 is of a concave shape relative to a center of the interior space of the coil 3008 and 3020, and the second side 3034 and 3036 is of a convex shape.

In some embodiments, each of the one or more optical image stabilization coils 3008 and 3020 is arranged in a compressed oval ring cylinder shape having a first axis (e.g., width in x 3054) of bilateral symmetry and no second axis of bilateral symmetry.

In some embodiments, the one or more optical image stabilization coils 3008 and 3020 include a pair of optical image stabilization coils 3008 and 3020 situated opposite one another with respect to the optical package 3006 and during operation may be configured to circulate current in opposite directions of rotation 3014 and 3016.

Some alternative embodiments of an electromagnetic actuator include one or more lateral magnets situated at one or more sides of a member movable, though not necessarily moving a lens assembly, by the actuator, and one or more coils for generating magnetic interactions with a respective one of the one or more lateral magnets to move the member, wherein each of the one or more coils has an interior surface boundary, and a space enclosed by the interior surface boundary has a width greater at ends of a length of the space than at a center of a length of the space.

In some embodiments, the one or more coils include a pair of optical image stabilization coils situated opposite one another with respect to the optical package and circulating in opposite directions if rotation.

Figure 4:
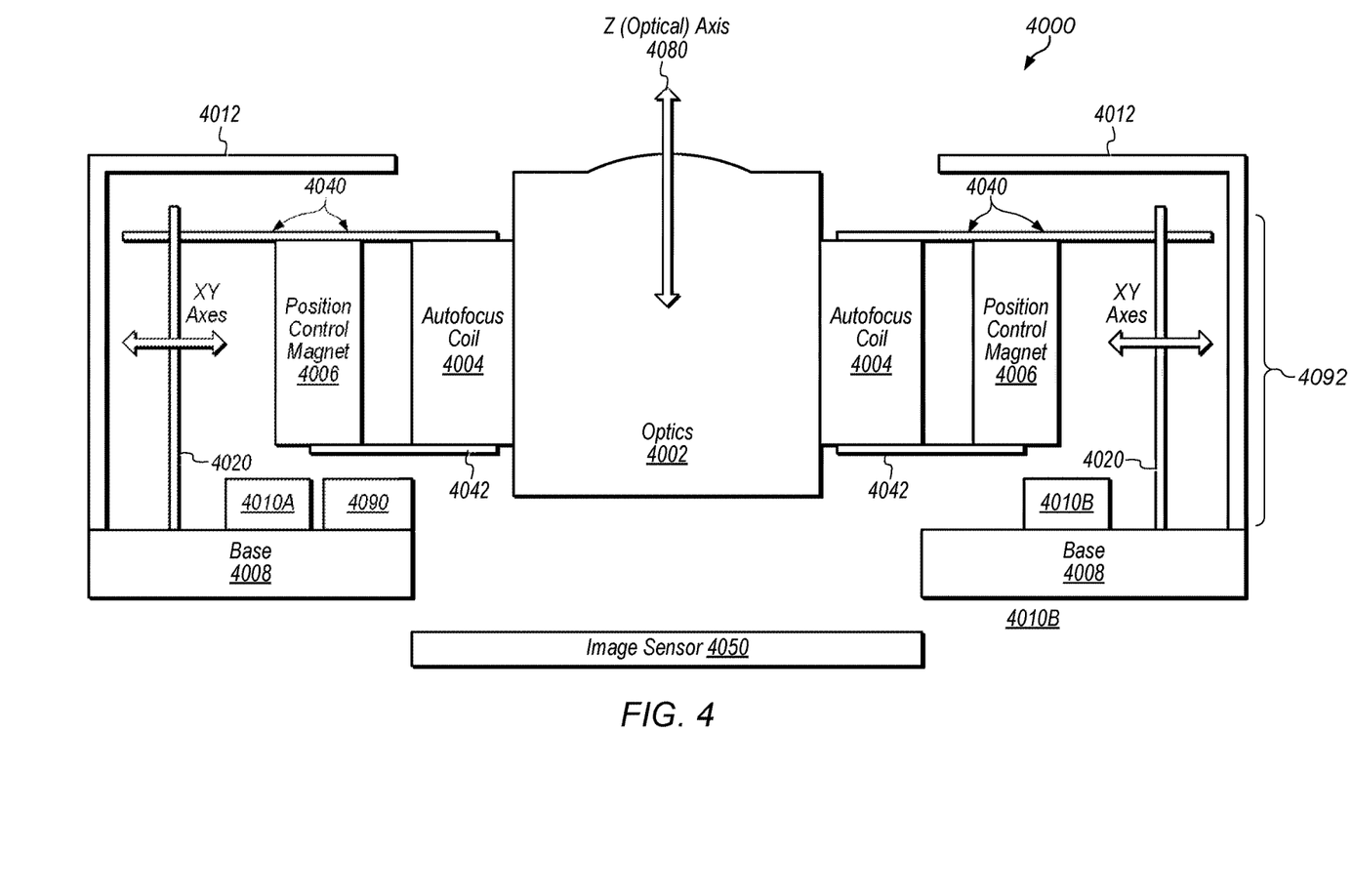
FIG. 4 depicts a side view of an example embodiment of an actuator module or assembly that may, for example, be used to provide position control in small form factor cameras, using coils according to at least some embodiments.

FIG. 4 depicts side view of an example embodiment of an actuator module or assembly that may, for example, be used to provide inductive sensing for autofocus position detection in small form factor cameras, according to at least some embodiments. In particular, with reference to FIG. 4, embodiments of inductive sensing for autofocus position detection may be applied within an actuator package or assembly 4000 interacting with an image sensor 4050 as illustrated in FIG. 4 to stabilize and increase control performance of an optics assembly 4002 suspended on wires 4020 within an actuator package 4000 as shown in FIG. 4. Details of example embodiments, implementations, and methods of operations of optical image stabilization actuators are discussed below with respect to FIGS. 5-9.

In some embodiments, each position control magnet 4006 is poled so as to generate a magnetic field, the useful component of which for the autofocus function is perpendicular to the optical axis of the camera/lens, and perpendicular to the plane of each magnet 4006 proximate to the autofocus coil 4004, and where the field for all four magnets 4006 are all either directed towards the autofocus coil 4004, or away from it.

As shown in FIG. 4, an actuator package 4000 may include a base assembly or substrate 4008, an optics assembly 4002, and a cover 4012. Base assembly 4008 may include one or more of, but is not limited to, a base 4008 and suspension wires 4020, which enable inductive sensing for autofocus position detection by detecting movements of autofocus coil 4004.

In at least some embodiments, there are four suspension wires 4020. An optics assembly 4002 may be suspended on the base assembly 4008 by suspension of the upper springs 4040 of optics assembly 4000 on the suspension wires 4020. Actuator module 4000 may include one or more of, but is not limited to, optics 4002, optics holder (autofocus coil) 4004, magnet(s) 4006, upper spring(s) 4040, optical image stabilization coils 4010A-B and lower spring(s) 4042. The upper and lower spring(s) may be collectively referred to herein as optics springs. In optics assembly 4000, an optics component 4002 (e.g., a lens or lens assembly) may be screwed, mounted or otherwise held in or by an optics holder (autofocus coil) 4004. In at least some embodiments, the optics 4002/optics holder (autofocus coil) 4004 assembly may be suspended from or attached to the position control magnets 4006 by upper spring(s) 4040, and lower spring(s) 4042, and the position control magnets 4006 may be rigidly mounted to base 4008. Note that upper spring(s) 4040 and lower spring(s) 4042 are flexible to allow the optics assembly 4000 a range of motion along the Z (optical) axis for optical focusing, wires 4020 are flexible to allow a range of motion on the XY plane perpendicular to the optical axis for optical image stabilization.

Note that, in some embodiments, an optics assembly 4000 or an actuator module may not include position control magnets 4006, but may include a yoke or other structure 4006 that may be used to help support the optics assembly on suspension wires 4020 via upper sprigs 4030. However in some embodiments, optics assembly 4000 may not include elements 4006. In general, other embodiments of an optics assembly 4000 may include fewer or more components than the example optics assembly 4000 shown in FIG. 4. Also note that, while embodiments show the optics assembly 4000 suspended on wires 4020, other mechanisms may be used to suspend an optics assembly 4000 in other embodiments.

The autofocus yoke (e.g., magnets or holder(s) 4006) acts as the support chassis structure for the autofocus mechanism of actuator 4000. The lens carrier (optics holder 4004) is suspended on the autofocus yoke by an upper autofocus (AF) spring 4040 and a lower optics spring 4042. In this way when an electric current is applied to the autofocus coil, Lorentz forces are developed due to the presence of the four magnets, and a force substantially parallel to the optical axis is generated to move the lens carrier, and hence lens, along the optical axis, relative to the support structure of the autofocus mechanism of the actuator, so as to focus the lens. In addition to suspending the lens carrier and substantially eliminating parasitic motions, the upper spring 4040 and lower spring 4042 also resist the Lorentz forces, and hence convert the forces to a displacement of the lens. This basic architecture shown in FIGS. 3-4 and is typical of some embodiments, in which optical image stabilization function includes moving the entire autofocus mechanism of the actuator (supported by the autofocus yoke) in linear directions perpendicular to the optical axis, in response to user handshake, as detected by some means, such a two or three axis gyroscope, which senses angular velocity. The handshake of interest is the changing angular tilt of the camera in 'pitch and yaw directions', which can be compensated by said linear movements of the lens relative to the image sensor.

At least some embodiments may achieve this two independent degree-of-freedom motion by using two pairs of optical image stabilization coils, each pair acting together to deliver controlled motion in one linear axis perpendicular to the optical axis, and each pair delivering controlled motion in a direction substantially perpendicular to the other pair. In at least some embodiments, these optical image stabilization coils may be fixed to the camera actuator support structure, and when current is appropriately applied, optical image stabilization coils may generate Lorentz forces on the entire autofocus mechanism of the actuator, moving it as desired. The required magnetic fields for the Lorentz forces are produced by the same four magnets that enable to the Lorentz forces for the autofocus function. However, since the directions of motion of the optical image stabilization movements are perpendicular to the autofocus movements, it is the fringing field of the four magnets that are employed, which have components of magnetic field in directions parallel to the optical axis.

Returning to FIGS. 3-4, in at least some embodiments, the suspension of the autofocus mechanism on the actuator 4000 support structure may be achieved by the use of four corner wires 4020, for example wires with a circular cross-section. Each wire 4020 acts as a flexure beams capable of bending with relatively low stiffness, thus allowing motion in both optical image stabilization degrees-of-freedom. However, wire 4020 is in some embodiments relatively stiff in directions parallel to the optical axis, as this would require the wire to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each wire 4020 is stiff in directions that require it to change in length, and hence the fixed points at the ends of each wire (eight points in total) will substantially form the vertices of a parallelepiped for all operational positions of the optical image stabilization mechanism.

In some embodiments, a package of processors, driver circuits, and memory 4090 or other computer-readable medium as described herein may alternatively, in some embodiments, be omitted from actuator module 4000 and housed elsewhere in a device in which actuator package 4000 is installed.

In some embodiments, actuator package 4000 is installed in a camera of a mobile computing device. The autofocus yoke (e.g., magnets or holder(s) 4006) supports a lens carriage (e.g., optics 4002), The yoke is attached to a chassis (e.g. base 4008) using one or more suspension wires 4020.

In some embodiments, driver circuit 4090 includes a voltage source capable of delivering an alternating electrical signal to the autofocus coil 4004.

In some embodiments, a camera unit 4000 of a multi-function device includes an image sensor 4050 and an actuator 4092 for adjusting the light captured by the image sensor 4050 through movement of the actuator 4092 in one or more degrees of freedom. In some embodiments, the actuator 4092 includes one or more lateral magnets 4006 situated at one or more sides of the actuator 4092. In some embodiments, each of the one or more magnets 4006 has a respective magnetic field aligned in a direction perpendicular to a direction perpendicular to a light-receiving surface of the image sensor 4050. In some embodiments, the camera unit further includes one or more optical image stabilization coils 4010A-B for circulating electric current in a plane perpendicular to the an optical axis 4080 of the direction perpendicular to a light-receiving surface of the image sensor 4050 to generate magnetic interactions with a respective one of the one or more lateral magnets 4006. In some embodiments, each of the optical image stabilization coils 4010A-B has an interior surface boundary. In some embodiments, a space enclosed by the interior surface boundary has a width smaller at a center of a length of the optical image stabilization coil than at the ends of the optical image stabilization coil.

Figure 5A:
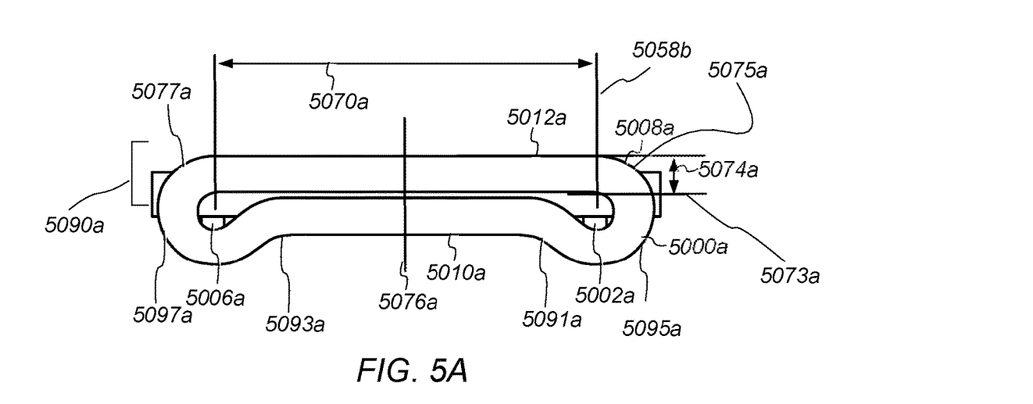
FIGS. 5A-B illustrate schematics of coils that are example embodiments of coils for actuator modules or assembly with coils designed according to at least some embodiments.
Figure 5B:
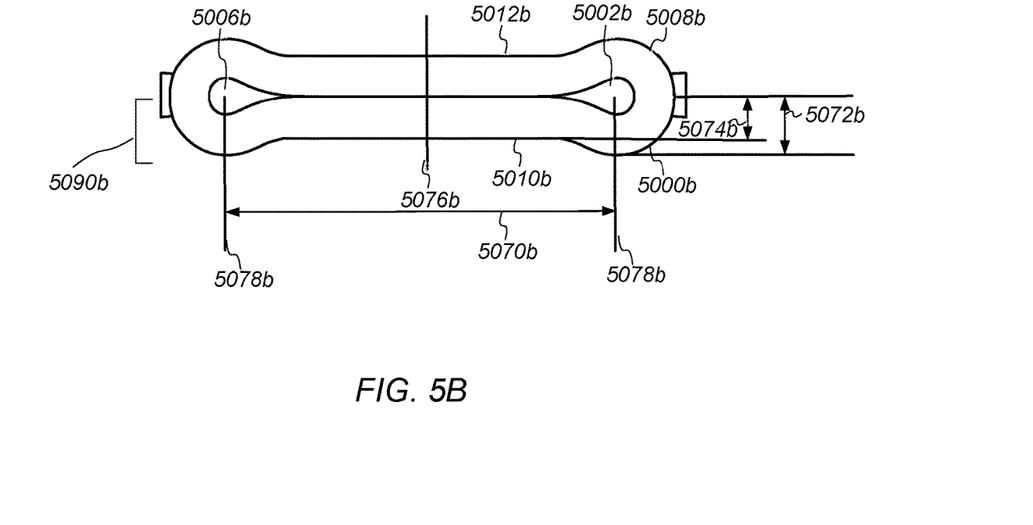

FIGS. 5A-B illustrate schematics of coils that are example embodiments of coils for actuator modules or assembly with coils designed according to at least some embodiments. In some embodiments, one or more (or in some instances each) of the optical image stabilization coils 5000a-b has an interior surface boundary 5002a-b, and a space 5006a-b enclosed by the interior surface boundary 5002a-b has a width (e.g., a dimension in a y 5056 direction) smaller at a center of a length (e.g., a dimension in a x 5054 direction) of the optical image stabilization coil 5000a-b than at the ends of the optical image stabilization coil 5000a-b. Such coil arrangements may have the advantage of reducing a size of an actuator, as discussed herein, or of increasing the concentration of a magnetic field.

In some embodiments, and as used with respect to FIGS. 5A-5B, a convex shape comprises an arrangement such that a coil side 5090a having an interior length 5070a centered on a center 5076a has a width 5074a at the center 5076a that is constant across the length 5070a, and a concave shape comprises an arrangement such that a coil side 5090b having an interior length 5070b and a center 5076b had an interior to exterior width 5074b at the center 5076b less than an interior to exterior width 5072b at an end 5078b of the interior length 5070b.

In some embodiments, the concave shape includes a first bend 5095a and a second bend 5097a outward from a length centerline 5073a and a third bend 5091a and a fourth bend 5093a inward toward the length centerline 5073a. In some embodiments, the convex shape includes a first convex bend 5075a and a second convex bend 5077a outward from a length centerline without any third bend any the fourth bend inward toward the length centerline.

In some embodiments, the one or more optical image stabilization coils 5000b include an exterior surface boundary 5008b having first side 5010b and a second side 5012b relative to the length. In some embodiments, the first side 5010b is of a concave shape relative to a center of the coil 5000b. In some embodiments, the second side 5012b is of a concave shape relative to the center of the coil 5000b.

In some embodiments, the one or more optical image stabilization coils 5000a include an exterior surface boundary 5008a having first side 5010a and a second side relative 5012a to the length. In some embodiments, the first side 5010a is of a concave shape, and the second side 5012a is of a convex shape.

In some embodiments, each of the one or more optical image stabilization coils 5000a is arranged in a compressed oval ring cylinder shape having a first axis of bilateral symmetry (e.g., a y 5056 direction) and no second axis of bilateral symmetry (e.g., none in a x 5054 direction).

In some embodiments, each of the one or more optical image stabilization 5000b coils is arranged in a compressed oval ring cylinder shape having a first axis of bilateral symmetry (e.g., a y 5056 direction) and a second axis of bilateral symmetry (e.g., in a x 5054 direction).

In some embodiments, each of the one or more optical image stabilization coils is arranged in a compressed oval ring cylinder shape, wherein an interior length (e.g., a dimension in a x 5054 direction) of an interior space enclosed by the oval ring cylinder shape is greater than an interior width (e.g., a dimension in a y 5056 direction) of the interior space enclosed by the oval ring cylinder shape.

Example Computer System

Figure 6:
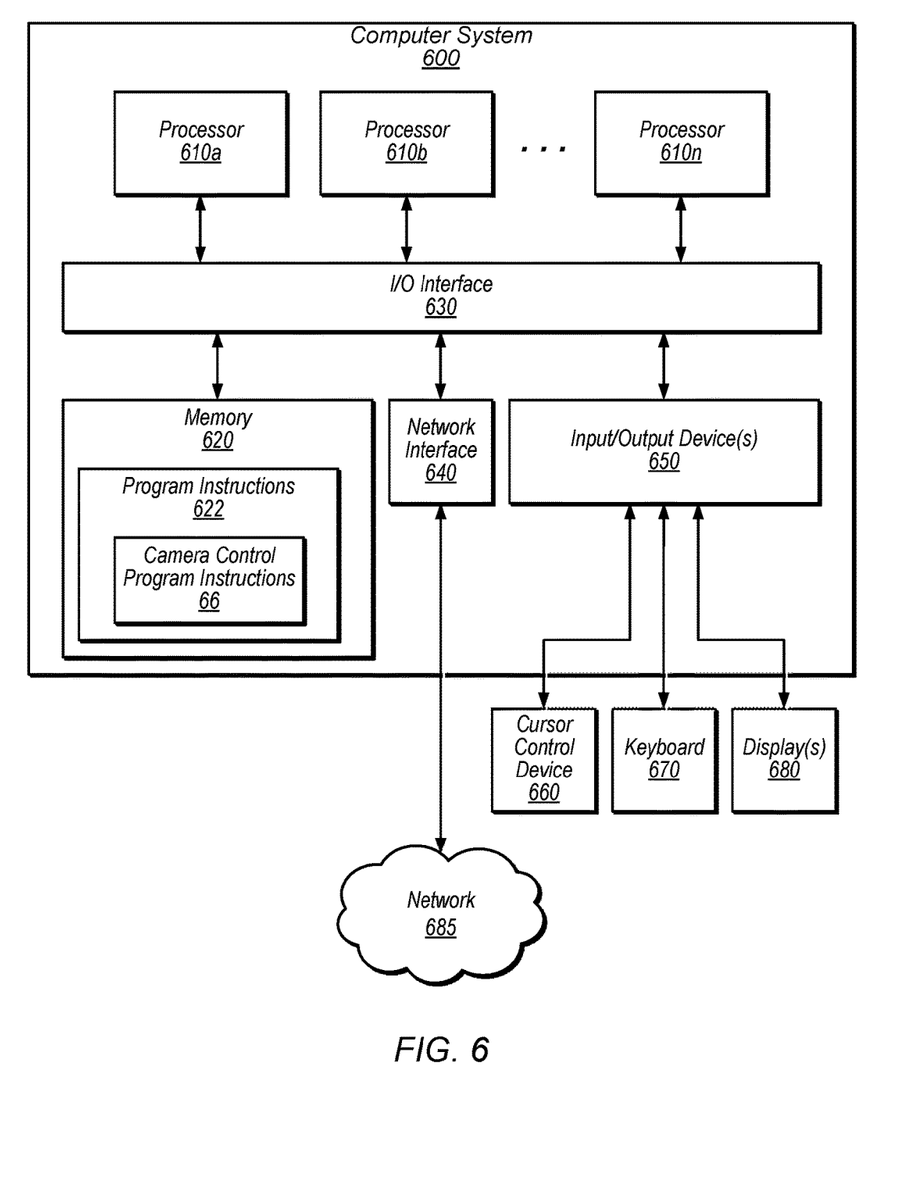
FIG. 6 illustrates an example computer system configured to implement aspects of the system and method for camera control with inductive sensing for autofocus position detection, according to some embodiments.

FIG. 6 illustrates an example computer system 600 that may be configured to execute any or all of the embodiments described above. In different embodiments, computer system 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of inductive position sensing, as described herein may be executed in one or more computer systems 600, which may interact with various other devices. Note that any component, action, or functionality described above with respect to FIGS. 1-8 may be implemented on one or more computers configured as computer system 600 of FIG. 6, according to various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store camera control program instructions 622 and/or camera control data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions 622 may be configured to implement a lens control application 624 incorporating any of the functionality described above. Additionally, existing camera control data 632 of memory 620 may include any of the information or data structures described above. In some embodiments, program instructions and/or data may be received, sent or stored upon different types of computer-accessible media or on similar media separate from system memory 620 or computer system 600. While computer system 600 is described as implementing the functionality of functional blocks of previous Figures, any of the functionality described herein may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network 685 (e.g., carrier or agent devices) or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 622, which may be processor-executable to implement any element or action described above. In one embodiment, the program instructions may implement the methods described above. In other embodiments, different elements and data may be included. Note that data may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera unit of a multifunction device, comprising:
   an image sensor having an optical axis of the image sensor;
   an optical package for directing light to the image sensor along the optical axis of the image sensor; and
   an actuator for moving the optical package relative to the image sensor in one or more degrees of freedom, wherein the actuator comprises:
      one or more lateral magnets situated at one or more sides of the actuator, wherein each of the one or more magnets has a respective magnetic field aligned in a direction perpendicular to a direction of the optical axis of the image sensor, and
      one or more optical image stabilization coils for circulating electric current in a plane perpendicular to the optical axis of the image sensor to generate magnetic interactions with a respective one of the one or more lateral magnets, wherein for at least one of the one or more optical image stabilization coils a length of the coil is longer than a width of the coil, and opposing sides of the coil that oppose one another across a centerline parallel to the length of the coil both have a concave shape along an outer perimeter of the coil.

2. The camera unit of claim 1, wherein:
   each of the one or more optical image stabilization coils is arranged in a compressed oval ring cylinder shape having a first axis of bilateral symmetry and a second axis of bilateral symmetry.

3. The camera unit of claim 1, wherein:
   each of the one or more optical image stabilization coils is arranged in a compressed oval ring cylinder shape, wherein an interior length of an interior space enclosed by the oval ring cylinder shape is greater than an interior width of the interior space enclosed by the oval ring cylinder shape.

4. The camera unit of claim 1, wherein the one or more optical image stabilization coils comprise:
   a pair of optical image stabilization coils situated opposite one another with respect to the optical package and that circulate current in opposite directions of rotation.

5. An electromagnetic actuator, comprising:
   one or more lateral magnets situated at one or more sides of a member movable by the actuator; and
   one or more coils for generating magnetic interactions with a respective one of the one or more lateral magnets to move the member, wherein for at least one of the one or more coils a length of the coil along a plane is longer than a width of the coil along the plane, and opposing sides of the coil that oppose one another across a centerline parallel to the length of the coil both have a concave shape along an outer perimeter of the coil, the outer perimeter of the coil extending continuously along the plane.

6. The electromagnetic actuator of claim 5, wherein each of the one or more magnets has a respective magnetic field aligned in a direction perpendicular to a direction of motion of the member.

7. The electromagnetic actuator of claim 5, wherein:
   the one or more coils are arranged in a compressed oval ring cylinder shape having a first axis of bilateral symmetry and a second axis of bilateral symmetry.

8. The electromagnetic actuator of claim 5, wherein:
the one or more coils are arranged in a compressed oval ring cylinder shape, wherein an interior length of an interior space enclosed by the oval ring cylinder shape is greater than an interior width of the interior space enclosed by the oval ring cylinder shape.

9. The electromagnetic actuator of claim 5, wherein the one or more coils comprise:
a pair of optical image stabilization coils situated opposite one another with respect to the movable member and that circulate current in opposite directions of rotation.

10. A camera unit of a multifunction device, comprising:
an image sensor; and
an actuator for adjusting light captured by the image sensor through movement of the actuator in one or more degrees of freedom, wherein the actuator comprises:
one or more lateral magnets situated at one or more sides of the actuator, wherein each of the one or more magnets has a respective magnetic field aligned in a direction perpendicular to a direction perpendicular to a light-receiving surface of the image sensor, and
one or more optical image stabilization coils for circulating electric current in a plane perpendicular to an optical axis of the light-receiving surface of the image sensor to generate magnetic interactions with a respective one of the one or more lateral magnets, wherein for at least one of the one or more optical image stabilization coils a length of the coil is longer than a width of the coil, and opposing sides of the coil that oppose one another across a centerline parallel to the length of the coil both have a concave shape along an outer perimeter of the coil.

11. The camera unit of claim 10, wherein:
each of the one or more optical image stabilization coils is arranged in a compressed oval ring cylinder shape having a first axis of bilateral symmetry and a second axis of bilateral symmetry.

* * * * *